United States Patent [19]

Kato et al.

[11] Patent Number: 4,497,037

[45] Date of Patent: Jan. 29, 1985

[54] APPARATUS FOR MANAGING A GROUP OF COPYING MACHINES

[75] Inventors: Takaaki Kato, Toyohashi; Takeshi Kato, Funabashi; Yoshikazu Yoshizawa, Ebina, all of Japan

[73] Assignees: Nippondenso Co., Ltd., Kariya; Systemkiki Co., Ltd.; Fuji Xerox Co., Ltd., both of Tokyo, all of Japan

[21] Appl. No.: 324,951

[22] Filed: Nov. 25, 1981

[30] Foreign Application Priority Data

Nov. 26, 1980 [JP] Japan ............................ 55-166179

[51] Int. Cl.[3] ............................................ G06F 15/20

[52] U.S. Cl. ................................ 364/900; 355/14 C; 355/14 CU

[58] Field of Search ... 364/200 MS File, 900 MS File, 364/400, 401, 405, 518; 355/14 C, 14 CU, 14 R; 377/8, 15, 16; 235/1 R, 91 R, 91 PR

[56] References Cited

U.S. PATENT DOCUMENTS

| | | | |
|---|---|---|---|
| 3,358,570 | 12/1967 | Morrill et al. | 355/14 CU |
| 3,988,570 | 10/1976 | Murphy et al. | 364/401 |
| 4,104,726 | 8/1978 | Fisk et al. | 355/14 C |
| 4,109,313 | 8/1978 | Donohue et al. | 355/14 C |
| 4,128,756 | 12/1978 | Nagano et al. | 355/14 CU |
| 4,203,663 | 5/1980 | Ogura et al. | 355/14 C |
| 4,220,991 | 9/1980 | Hamano et al. | 364/405 |
| 4,254,472 | 3/1981 | Juengel et al. | 364/900 |
| 4,260,878 | 4/1981 | Kawamura et al. | 235/92 AC |
| 4,314,334 | 2/1982 | Daughton et al. | 355/14 C |
| 4,319,326 | 3/1982 | Uchida | 364/900 |
| 4,346,442 | 8/1982 | Musmanno | 364/900 |
| 4,355,369 | 10/1982 | Garvin | 364/900 |
| 4,360,872 | 11/1982 | Suzuki et al. | 364/900 |

FOREIGN PATENT DOCUMENTS

| | | |
|---|---|---|
| 49-66116 | 6/1974 | Japan . |
| 50-85320 | 7/1975 | Japan . |
| 54-3539 | 1/1979 | Japan . |
| 54-104837 | 8/1979 | Japan . |

*Primary Examiner*—Jerry Smith
*Assistant Examiner*—Gary V. Harkcom
*Attorney, Agent, or Firm*—Cushman, Darby & Cushman

[57] ABSTRACT

A copying machine group managing system comprises a plurality of copying machines, a plurality of terminal devices each provided for one of the copying machines and a central managing unit for managing the terminal devices. Each of the terminal devices receives first input signals each indicative of one of a plurality of users divisions of the copying machines and a second input signal indicative of a utilization value of associated one of the copying machines, whereby a second input signal is stored at predetermined storage locations of a terminal data memory in accordance with a first input signal and the stored data signal is transmitted to the central managing unit. The central managing unit receives the cumulatively stored data signals from each of the terminal devices so that the received data signals are summed up separately for each of the users divisions of the copying machines and are stored at the corresponding storage locations of a central data memory.

1 Claim, 11 Drawing Figures

APPARATUS FOR MANAGING A GROUP OF COPYING MACHINES

PREAMBLE

The present invention relates to an apparatus for managing a plurality of copying machines installed whereby a plurality of users divisions (or users) are allowed to use any one of the copying machines and also the values of copies produced by the plurality of copying machines for the respective users divisions can be managed collectively.

In the past, it has been known to separately manage the value of copies (e.g., the accumulated number of copies value) of each of a plurality of users divisions using jointly a single copying machine. For instance, Japanese Laid-Open Patent Publication No. 54-104837 and already laid open discloses that by recognizing a users division identifying code recorded on a portable information recording medium (e.g., a magnetic card) distributed to each of users divisions, the value of copies made by the users divisions is cumulatively stored in a predetermined storage area of a data storage device which is specified by the code. Also, Japanese Laid-Open Patent Publication No. 54-3539 discloses that each user identifying code is set and entered by a ten-key switch.

With the recent advent of an information dominated area, there has been rapidly increasing need for the copying service and there have been cases where a users' group including a large number of users such as government or public offices, enterprises or educational institutions installs a plurality of copying machines thus allowing the large number of users or a number of users divisions each comprising particular ones of the users to use any of the copying machines. With this manner of using a group of copying machines, it has been required to collectively manage the values of copies produced by the copying machine group for the respective users divisions (or the users) from the standpoint for example of allotting a portion of the cost of copies to each of the beneficiaries.

With the heretofore proposed apparatus of the type which manages a single copying machine, however, the values of utilization of the copying machine by the respective users divisions are simply stored in the data storage device for the copying machine. Thus, if the prior art apparatus is applied as such to the previously mentioned method of using a group of copying machines, the utilization value data of the respective users divisions will be scattered in the memory devices of the copying machines and a burden on the human labor for collecting and summing up the data will be increased. Moreover, this burden has a tendency to increase more and more with increase in the number of copying machines and the number of users divisions.

It is therefore an object of the present invention to provide an apparatus for managing a group of copying machines which is capable of collectively collecting and summing up the utilization value of each of users divisions with respect to the respective copying machines and which has been improved in managing efficiency.

It is another object of the present invention to provide an apparatus for managing a group of copying machines which has improved reliability in the maintenance of utilization value data.

BRIEF DESCRIPTION OF THE DRAWINGS

This invention will be apparent from the following description taken in conjunction with the accompanying drawings, in which.

DETAILED DESCRIPTION

Figure 1:
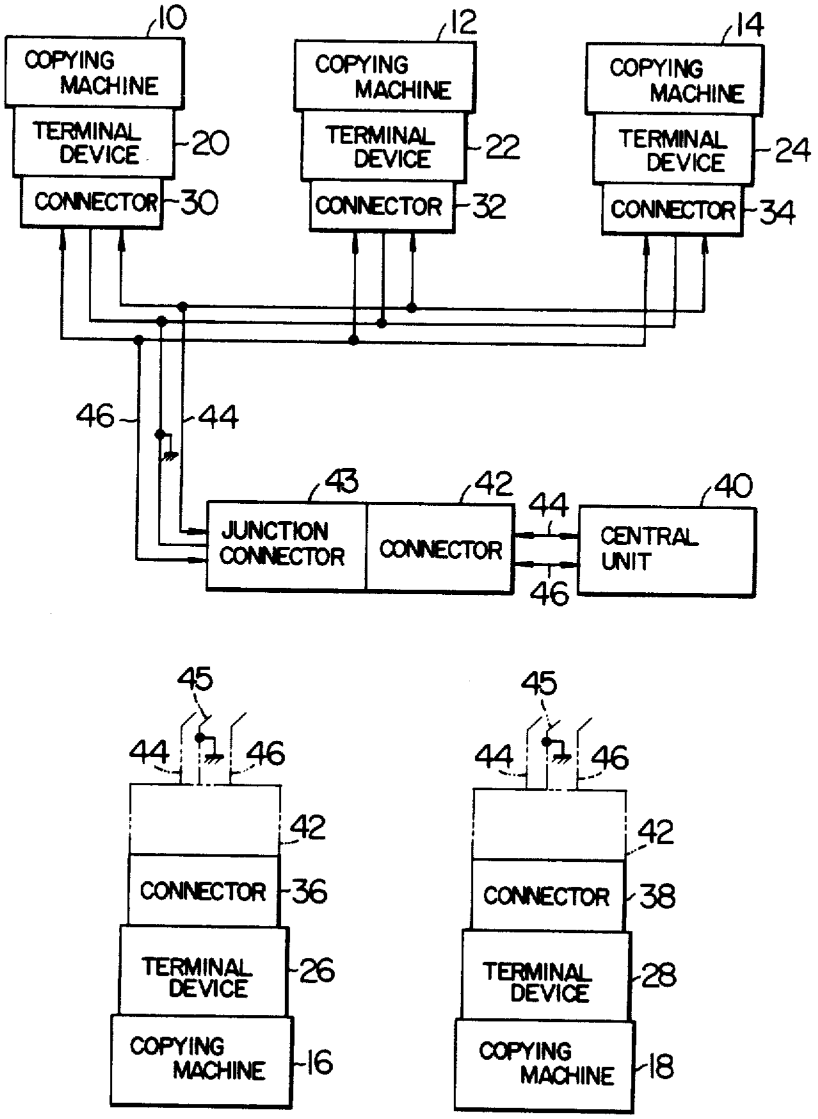
FIG. 1 is a diagram showing the arrangement of terminal devices and a central unit.

The present invention will now be described in greater detail with reference to the illustrated embodiment. FIG. 1 shows the embodiment in which the invention is applied to the management of a plurality of copying machines 10, 12, 14, 16 and 18. These copying machines are equipped with terminal devices 20, 22, 24, 26 and 28, respectively, and these terminal devices are provided with signal transmitting and receiving connectors 30, 32, 34, 36 and 38.

Also provided is a central unit 40 which is adapted for communication with each of the terminal devices 20, — , 28. In this embodiment, a known party line system of the direct current transmission type is used as the communication system between the terminal devices 20, — , 28 and the central unit 40. Each of the terminal devices responds to the instruction signal included in the transmission data sent from the central unit 40 only when the address number (or the polling address) included in the transmission data coincides with the predetermined terminal number specific to the terminal device. In other words, the central unit 40 can always communicate with any one of the terminal devices only through the use of two signal lines 44 and 46 irrespective of the number of the terminal devices. As a result, by connecting a connector 42 of the central unit 40 to a junction connector 43 which is connected in parallel with the connectors 30, 32 and 34 of the terminal devices 20, 22 and 24, the central unit 40 can specify and communicate with any one of the terminal devices 20, 22 and 24 in an on-line manner. On the other hand, by connecting the connector 42 of the central unit 40 to one or the other of connectors 36 and 38 of the terminal devices 26 and 28, the central unit 40 can communicate with any one of the terminal devices in an off-line manner. As regards the process of data modulation for the data transmission, the complementary RZ method is used for transmitting purposes and the differential detection method is used for receiving purposes and no details of these known methods will be described. Also note that the following description will be made with reference to a case where the terminals 20, 22, 24, 26 and 28 are all operated by the on-line method and they are provided with the common signal lines.

Figure 2:
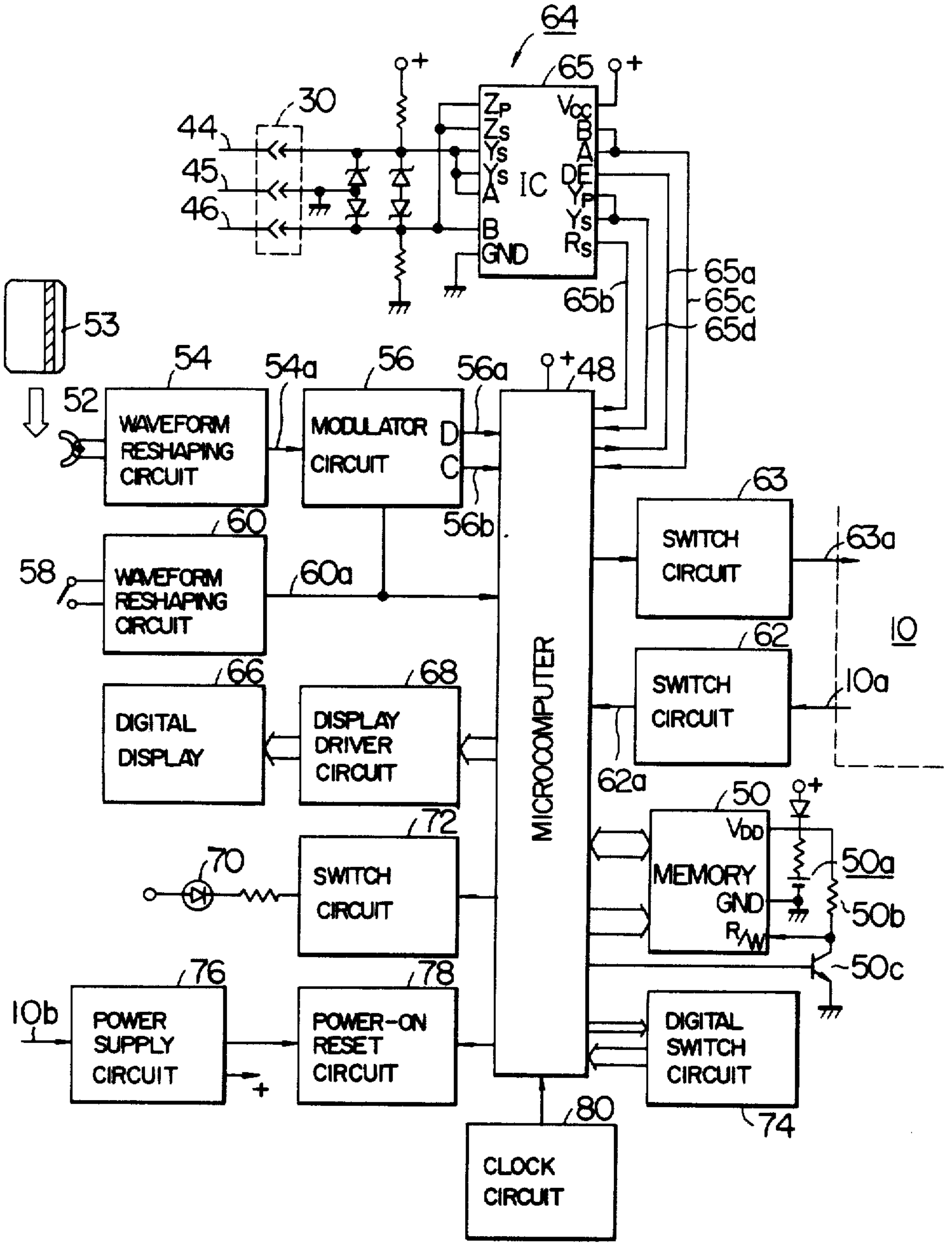
FIG. 2 is a schematic block diagram showing the construction of the terminal devices.

FIG. 2 shows the construction of the terminal devices by way of the terminal device 20. The terminal device comprises data processing means including a microcomputer 48 and a terminal data memory 50, first input means including a magnetic head 52, a waveform reshaping circuit 54, a demodulator circuit 56, a card detecting switch 58 and a waveform reshaping circuit 60 for receiving a magnetic code signal from a magnetic card, second input means including a switch circuit 62 for receiving a signal indicative of the number of copies made by the copying machine 10 and applying the signal to the microcomputer 48 and a communication circuit 64.

The card detecting switch 58 comprises a limit switch which will be closed by the force of the action of the magnetic card 53 when it is inserted into the slit (not shown) formed in the outer surface of the terminal device case and which will be opened when the card 53 is withdrawn from the slit. Note that a photoelectric switch comprising a photo coupler may be used in place of the limit switch. The waveform reshaping circuit 60 having a small time constant is connected to the switch 58 so that any chattering noise produced upon opening and closing of the switch 58 is eliminated and a detection signal 60*a* is generated to accurately indicate the presence or absence of a card.

The magnetic head 52 is positioned at the slit so that the magnetic information recorded digitally in the form of a serial binary signal on the magnetic card 53 is converted to an electric signal. This electric signal is applied to the waveform reshaping circuit 54 so that the signal is amplified and reshaped to a rectangular signal 54*a*. The demodulator circuit 56 derives signal components from the serial binary signal indicated by the rectangular signal 54*a* and applies them to the microcomputer 48.

In the present embodiment, the known F2F method is used as the magnetic recording method, and thus the democulator circuit 56 effects the process of demodulation in accordance with the F2F method in response to the positive-going transition of the card detection signal 60*a* so that a data signal 56*a* in the form of a serial binary signal comprising logical levels which are either "1" or "0" and clock pulse signals 56*b* each corresponding to one of the bits of the data signal are generated and applied to the input terminals of the microcomputer 48. The F2F method is one in which information is recorded on a single track with a single channel and the information is demodulated by the self-clocking action of the demodulator circuit. The details of the F2F-type demodulator circuit are disclosed for example in Japanese Laid-Open Patent Publications Nos. 49-66116 and 50-85320.

Figure 3:
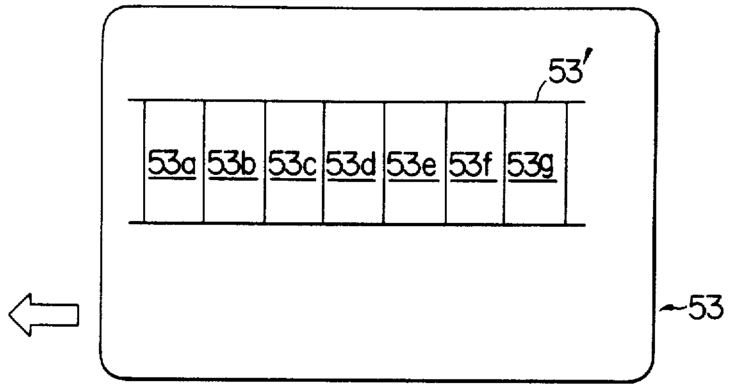
FIG. 3 is a schematic diagram showing the code format of a magnetic card.

The format of the magnetization code signal recorded on the magnetic card 53 will now be described with reference to FIG. 3. A single track 53' is formed in conformity with the card reading direction indicated by the arrow (that direction toward the read head 52), and recorded on this track are the data comprising a start code 53*a* (4 bits), ID code or check code 53*b* (4 bits), version code 53*c* (4 bits), number codes 53*d*, 53*e* and 53*g* (4 bits each) representing the hundreds, tens and ones values of the users division number and a stop code 53*g* (4 bits). The meaning and role of each of these codes will be described later.

Referring again to FIG. 2, a switch circuit 62 receives a "1" level copy pulse signal 10*a* generated from a copy pulse generating circuit (not shown) of the copying machine 10 each time it performs a copying operation and applies the signal as a switch signal 62*a* to the associated input terminal of the microcomputer 48.

A communication circuit 64 comprises a known type of integrated circuit device 65 for realizing the previously mentioned party-line system. This circuit device may comprise the SN75116 type device sold as a communication interface by Texas Instruments Incorporated. A transmission control line 65*a*, a reception control line 65*b*, a transmission data line 65*c* and a receiving data line 65*d* are connected to the microcomputer 48 and the indicated terminals of the circuit device 65, so that when a "1" level logic signal and a "0" level logic signal are applied as command signals of the microcomputer 48 to the transmission control line 65*a* and the receiving control line 65*b*, respectively, the circuit device 65 operates in the transmisson mode and thus the data of the serial binary signal applied to the transmission data line 65*c* from the microcomputer 48 is converted to a communication signal and delivered to the lines 44 and 46 via the connector 30. On the other hand, when a "0" level logic signal is applied to the transmission control line 65*a* and a "1" level logic signal is applied to the receiving control line 65*b*, the circuit device 65 operates in the receiving mode so that the communication signal sent via the lines 44 and 46 is converted to a serial binary signal and applied to the microcomputer 48.

More specifically, selection between the transmission and receiving modes of the communication circuit 64 is made by the microcomputer 48 so that when the transmission mode is selected, the transmission data from the microcomputer 48 is applied to the central unit 40 via the signal lines 44 and 46, whereas when the receiving mode is selected the reception data delivered via the signal lines 44 and 46 is applied to the microcomputer 48. Numeral 45 designates a ground line.

The terminal data memory 50 comprises a known type of random access memory (RAM) and is connected so as to allow the microcomputer 48 to select the storage locations and perform reading and writing of data (binary code signals). A back-up circuit 50*a* comprising a diode, a resistor and a rechargeable battery is connected to the memory 50 so as to preserve the data stored in the memory 50 even if the main power supply of the terminal device is no longer applied. In addition to this, a pull-up resistor 50*b* is provided so that a write inhibit signal (one for selecting the read mode) which is usually held at the "1" level is applied to a control input terminal R/W of the memory 50 at times including when the main power supply is disconnected. Thus, only when a "1" level signal is applied to a transistor 50*c* from the microcomputer 48, a "0" level write enable signal is applied to the control input terminal R/W and the memory 50 is used in the write mode.

The terminal data memory 50 possessed by each terminal device stores both the accumulated numbers of copies data of the respective users divisions (or the users division data) of the particular copying machine managed by each terminal device and the total number of copies data of the terminal device (or the terminal device data).

Figure 4:
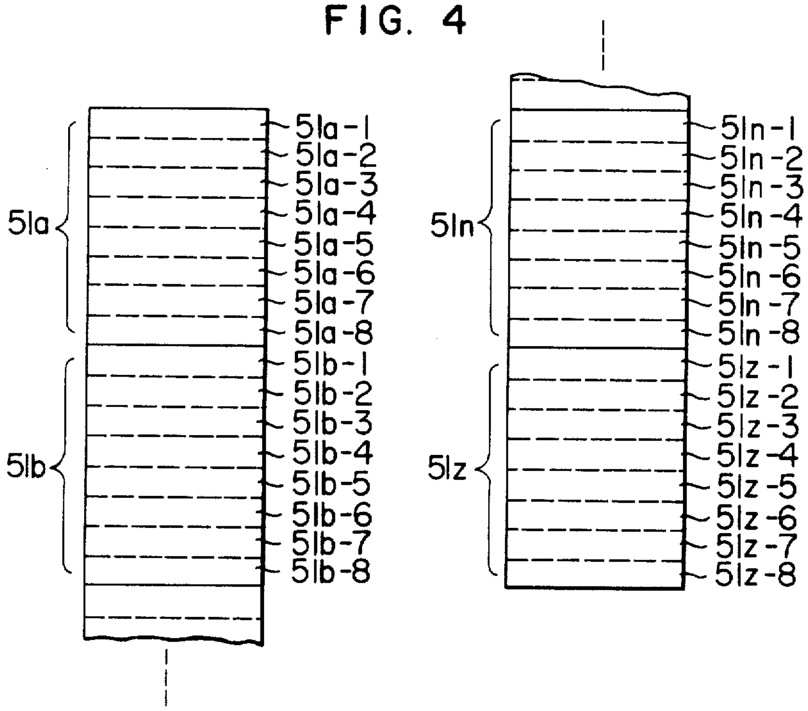
FIG. 4 is a schematic diagram showing the allocation of the storage locations in a terminal data memory.

FIG. 4 shows the allocation of the storage locations. Numeral 51*a* designates the location group assigned to a users division with a users division number $K_1$, and 51*b* the location group assigned to a users division with a users division number 001. In this way, there are provided the location groups corresponding in number to the users division codes recorded on the magnetic cards including from the one designated at 51*a* to the one designated at 51*n* and assigned to the users division with a users division number K*n*. These location groups of the users division each comprises 8 locations. Thus, in the case of the location group 51*a*, for example, it comprises a location 51*a*-1 for storing the ones value of each users division data having a maximum capacity of million copies, location 51*a*-2 for storing the tens value, location 51*a*-3 for storing the hundreds value, location 51*a*-4 for storing the thousands value, location 51*a*-5 for storing the ten-thousands value, location 51*a*-6 for storing the humdred-thousands value, location 51*a*-7 for storing the millions value and location 51*a*-8 for storing a version code indicative of whether the machine can be used by the users division. This is the same for the other location groups 51*b* to 51*n*.

Numeral 51*z* designates a location group for terminal device data comprising eight locations 51*z*-1 to 51*z*-8 assigned respectively to the ones, tens, hundreds, thousands, ten-thousands, hundred-thousands, million and ten-million values.

Each of the value storing locations forming the location groups 51*a* to 51*n* and 51*z* has a 4-bit memory capacity and stores the corresponding value in BCD form for purposes of convenience.

Referring again to FIG. 2, the microcomputer 48 which governs the main points of operation of the terminal devices is organically connected with the illustrated logical circuit blocks and it is also connected to a part of these logic circuit blocks so as to receive or supply signals thereto as mentioned previously, This microcomputer 48 comprises, in the form of an integrated LSI chip, a central processing unit (CPU), a read-only memory forming a program memory, a random-access memory (RAM), a timing generator, an input/output (I/O) port and a signal transmission bus and it forms a digital computer which repeatedly performs the required digital computational operations in a time-shared manner in accordance with a terminal device controlling control program preliminarily established by the stored program method. The MB8841 manufactured by FUJITSU LIMITED, may be suitably used for this microcomputer.

The remaining construction of the terminal device will now be described.

A switch circuit 63 amplifies the logic level signal generated at the associated output terminal of the microcomputer 48 and applies the amplified signal to the key switch circuit (not shown) of the copying machine 10 as a command signal 63*a* for enabling or disabling the operation of the copying machine. In this way, the terminal device having the right of management of the copying machine can make a decision to enable or disable the operation of the copying machine.

A digital display 66 is designed so that when the copying machine is used, the users division data of the divisions using the copying machine are numerically displayed, that is, the numerical data applied from the microcomputer 48 via a display driver circuir 68 is displayed in the form of a light-emission display.

A warning light-emitting diode 70 is responsive to a turn-on signal applied from the microcomputer 48 via a switch circuit 72 when the code modulation of the magnetic card 53 is improper so as to indicate the improper code modulation.

A digital switch circuit 74 is designed so that when the central unit 40 is to communicate with one of the terminal devices, corresponding one of the terminal device numbers (or polling addresses) for specifying the terminal device is selected. These terminal device numbers are preliminarily determined before the stage of arranging the terminal devices.

A power supply circuit 76 receives an ac power supply 10*b* from the copying machine 10, converts it to a fixed stable dc voltage and supplies the dc voltage to the microcomputer 48 and the other circuit elements. A power-on reset circuit 78 is responsive to the positive-going transition of the dc voltage generated from the power supply circuit 76 to generate a reset signal for starting the execution of the digital computational operations of the microcomputer 48 from the start location of its control program. A clock circuit 80 applies reference clock signals for causing the digital processing of the microcomputer 48 to proceed.

Figure 5:
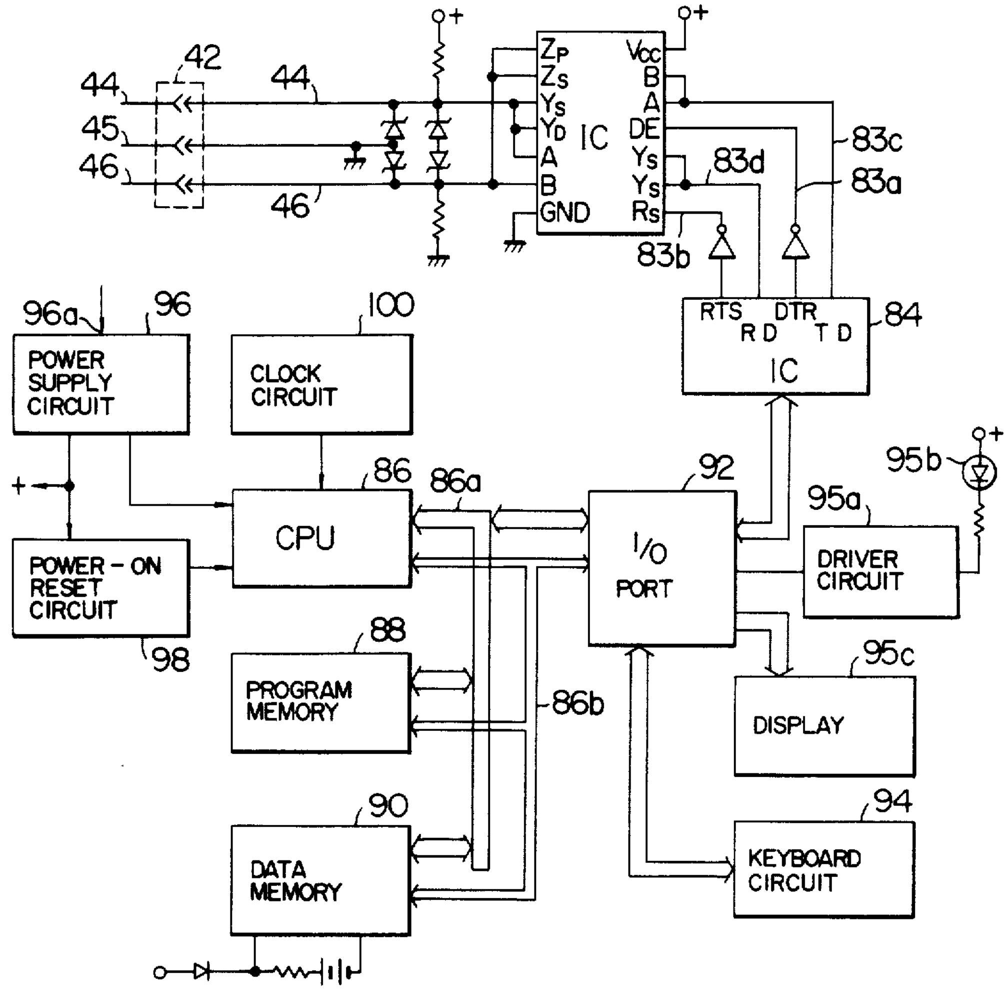
FIG. 5 is a schematic block diagram showing the construction of the central unit.

FIG. 5 shows the construction of the central unit 40. A communication circuit 82 is provided for the previously mentioned data communication network by the party-line system. This communication circuit comprises a 75116 type integrated circuit device 83 sold as a communication interface by Texas Instruments Incorporated and a 8521 type integrated circuit device called as a "USART" and soled as a data transmission device by Intel Corporation.

The "USART" 84 serves as a relay between a central processing unit (CPU) 86 included in data processing means which will be described later and the communication circuit device 83, so that in accordance with the commands from the CPU 86 logical level signals which select the transmission or receiving mode of the circuit device 83 are applied to transmission and reception control lines 83*a* and 83*b*, respectively, and the transmission data signal transmitted from the CPU 86 to the circuit device 83 via a transmission data line 83*c* and the reception data signal transmitted from the circuit device 83 to the CPU 86 via a receiving data line 83*d* are selectively relayed.

The data processing means of the central unit 40 comprises, as its principal components, the CPU 86, a program memory 88, a central data memory 90, an input/output interface 92 and a keyboard circuit 94 and these components are interconnected by means of an address/data bus 86*a* and a control signal line 86*b* thus causing the data processing means as a whole to function as a microcomputer. NOte that the NEC 8085 type may be suitably used for the CPU 86 and also the circuit devices sold for the CPU 8085 type may be suitably used for the memories 88 and 90 and the input/output interface 92. In particular, although not shown, various elements such as a chip selector and buffers are suitably connected in operatively associated relation so as to interconnect the associated functions of the circuit devices.

The program memory 88 comprises a read-only memory (ROM) and a control program of the control operations governed by the central unit 40 are predetermined according to the stored program method and preset into the program memory 88. The central data memory 90 comprises a random-access memory (RAM)

and it is used to temporarily store the data used in the course of data processing and store the data produced as a result of the data processing. A back-up circuit 91 is connected to the central data memory 90 in the like manner as the terminal data memory 50 mentioned previously.

The input/output interface (I/O port) 92 is comprised of the NEC 8225 type integrated circuit device and it effects the transmission of signals between the CPU 86 and the relay circuit device 84 of the communication circuit 82 and the keyboard circuit 94, respectively, in accordance with the control instructions from the CPU 86.

A light-emitting diode 95b is connected to the I/O port 92 via a driver circuit 95a so as to be turned on and off in accordance with the commands from the CPU 86. A digital type light-emitting display 95c (including a driver circuit) is connected to the I/O port 92 so as to display a numerical value in decimal form in accordance with a command from the CPU 86.

A power supply circuit 96 receives an ac power supply 96a, converts it to a fixed stable dc voltage and supplies the dc voltage to the CPU 86 and the other circuit elements. A power-on reset circuit 98 is responsive to the positive-going transition of the dc voltage generated from the power supply circuit 96 to generate a reset signal for initiating the execution of the digital computational operations in the CPU 86 from the start location of the control program stored in the program memory 88. A clock circuit 100 supplies the CPU 86 with the necessary reference clock signals for causing its digital processing to proceed.

The mutual operational linkages between the terminal devices 20, 22, 24, 26 and 28 and the central unit 40 are characterized by the control program which governs the operation of the respective data processing means. With these terminal devices, the following operations are governed by the control program.

(1) When any of the copying machines 10, 12, 14, 16 and 18 is used by any users division, the code signal indicative of the users division is introduced via the input means 52, 54, 56, 58 and 60 and stored temporarily in the internal RAM.

(2) The temporarily stored code signal is checked for its validity.

(3) If the result of the check of the code signal is negative, the light-emitting diode 70 gives a warning indication.

(4) If the result of the check of the code signal is affirmative, the operation of the copying machine to be managed is enabled.

(5) The number of pulse signals indicative of the number of copies and sent from the copying machine via the second input means 62 is added to the users division data (the accumulated number of copies data of the users division) and the terminal device data (the total number of copies data in the terminal device).

(6) The users division data and the terminal device data are stored in the data memory 50.

(7) The transmission signal from the central unit 40 is received via the communication circuit 64 so as to check whether the signal is a request-to-communicate for the terminal device.

(8) If it is the request-to-communicate for the terminal device, the contents of the transmission signal are interpreted. In this embodiment, the explanations of the transmission signals (or the instruction contents) are determined as follows.

(a) ACV (All Copy Value Send); Send the users division data of each of all the users divisions in succession. It is assumed that this instruction contains a request for transmission of the terminal device data.

(b) DCV (Division Copy Value Send), $N_1$, $N_2$, $N_3$; Send the users division data of one of the users divisions indicated by numerical values $N_1$, $N_2$, $N_3$.

(c) ACL (All Copy Value Clear); Clear all the users division data and the terminal device data to zero.

(d) DVC (Division Version Code Change), $N_1$, $N_2$, $N_3$, D; Change the version code of one of the users divisions specified by numerical values $N_1$, $N_2$ and $N_3$ to the value indicated by D. Note here that this version code is one which is stored in the corresponding storage location (51a-8, 51b-8, — , 51n-8) in the terminal data memory 50 as shown in FIG. 4 and which must be coincident with the version code 53c included in the magnetic information on the magnetic code 53.

(9) In response to the interpreted instruction contents, the number of copies data to be transmitted (SCV; Send Copy Value) or an acknowledgement of end of processing (ACK; Acknowledge) conforming with the instruction is included in the data to be transmitted to the central unit 40 and transmitted via the communication circuit 64.

(10) If the interpreted instruction is ACL or DVC, the instruction is executed.

Also, with the central unit 40, the following operations of its data processing means are governed by the control program.

(1) The keyboard operation in the keyboard circuit 94 is interpreted to determine which of the instructions ACV, DCV, ACL and DVC has been keyboarded.

(2) In accordance with the result of the above determination, a transmission data indicative of the instruction contents is transmitted to the terminal devices 20, 22, 24, 26 or 28 via the communication circuit 82.

(3) The data transmitted from the terminal devices 20, 22, 24, 26 or 28 and indicative of its answerback is received.

(4) The received transmission data is checked as to whether it is from the specified terminal device.

(5) When the transmission data indicative of any of the instructions ACL and DVC has been transmitted to the terminal device, the data received from the terminal device is checked whether it includes the acknowledgement of end of processing (ACK).

(6) When either of the checks (4) and (5) results in negative, the light-emitting diode 95b is turned on to give an error indication.

(7) When the transmission data indicative of one or the other of the instructions DCV and ACV has been transmitted to the terminal device, the operation of data summing is performed on the number of copies data (SCV) included in the data received from the terminal device in accordance with a predetermined computing procedure.

(8) The final data obtained by the summing operation is displayed on the display 95c in response to the request made by the keyboard operation in the keyboard circuit 94.

Figure 6:
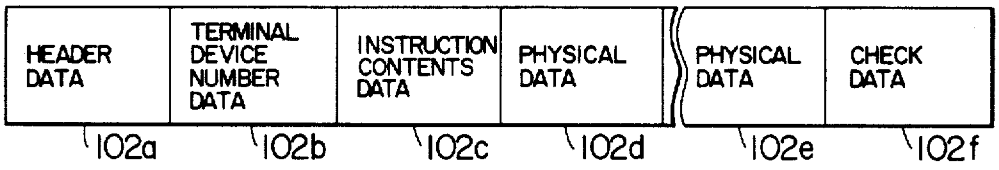
FIG. 6 is a schematic diagram showing the arrangement of communication data.

FIG. 6 shows the arrangement of communication data used for communication between the terminal devices and the central unit. Basically this communication data comprises a header data 102a, a terminal device number data (polling address) 102b, an instruction contents data 102c, physical data 102d and 102e and a check data 102f. The header data 102a comprises a predetermined start bit indicating the head of the communication data and a direction identification code of a predetermined form which signifies the direction of communication (from the terminal devices to the central unit or vice versa). The terminal device number data 102*b* is a specific value preliminarily assigned to each of the terminal devices. The instruction contents data 102*c* is coded in a predetermined manner to indicate one of the instructions ACV, DCV, ACL and DVC sent from the central unit to the terminal devices or to indicate either the end copy data SCV or the acknowledgement of end of processing ACK transmitted from the terminal device to the central unit. The contents and capacity (number of data) of the physical data 102*d* and 102*e* differ depending on the instruction contents data 102*c*. In the case of ACV, ACL and ACK, the physical data 102*d* and 102*e* have no contents. In the case of DCV, the users division indicative data $N_1$, $N_2$, $N_3$ is applied. In the case of DVC, the users division indicative data $N_1$, $N_2$, $N_3$ and the version code D are applied. In the case of SCV, the number of copies data is applied. A simple check data for a series of communication data expressing a meaning is assigned to the check data 102*f* in accordance with a known check system.

Now, the operations of the terminal devices 20, 22, 24, 26 and 28 and the central unit 40 relative to one another will now be described in accordance with the flow of the control program.

Figure 7:
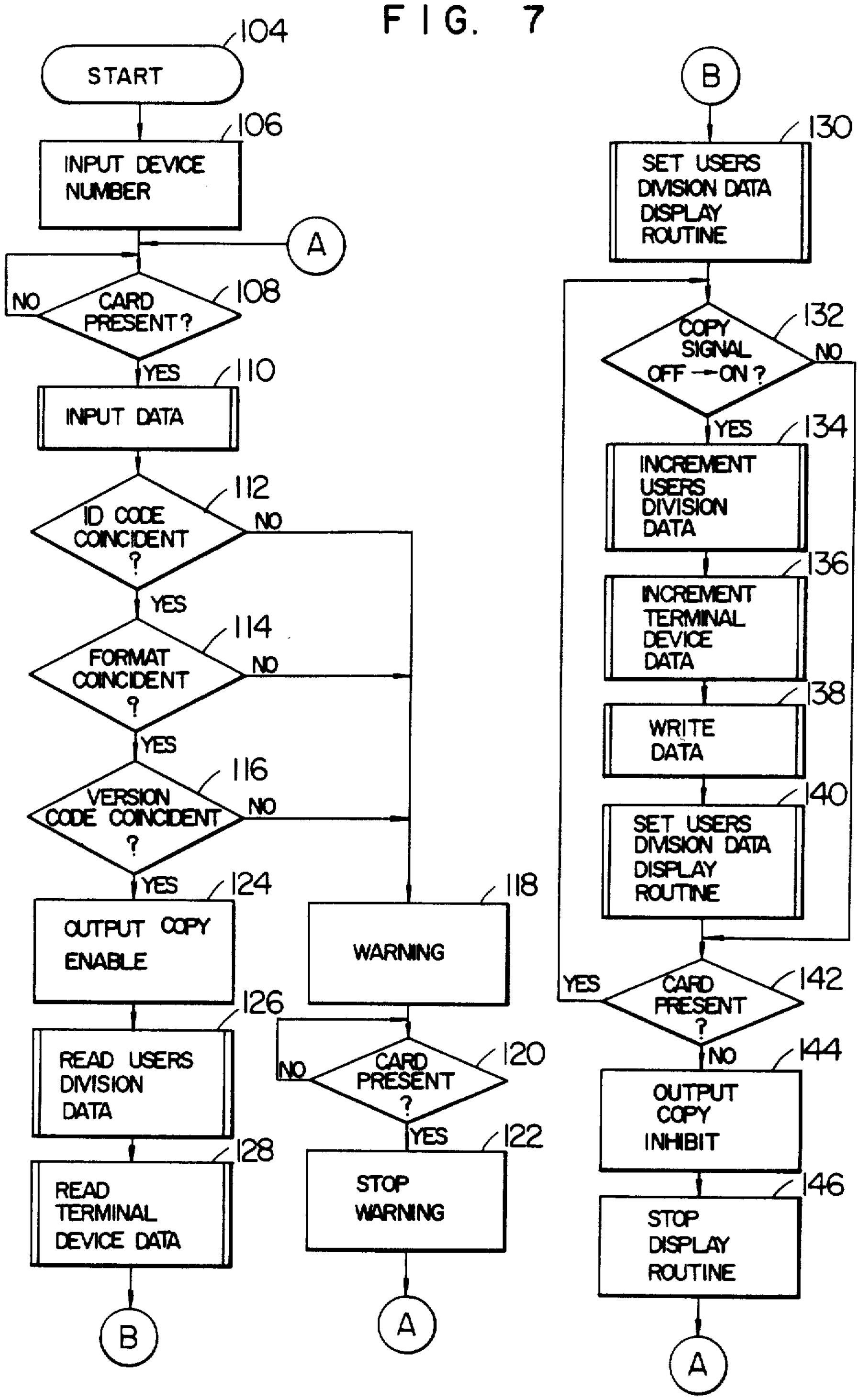
FIG. 7 is a flow chart showing the main program of the terminal devices.
Figure 8:
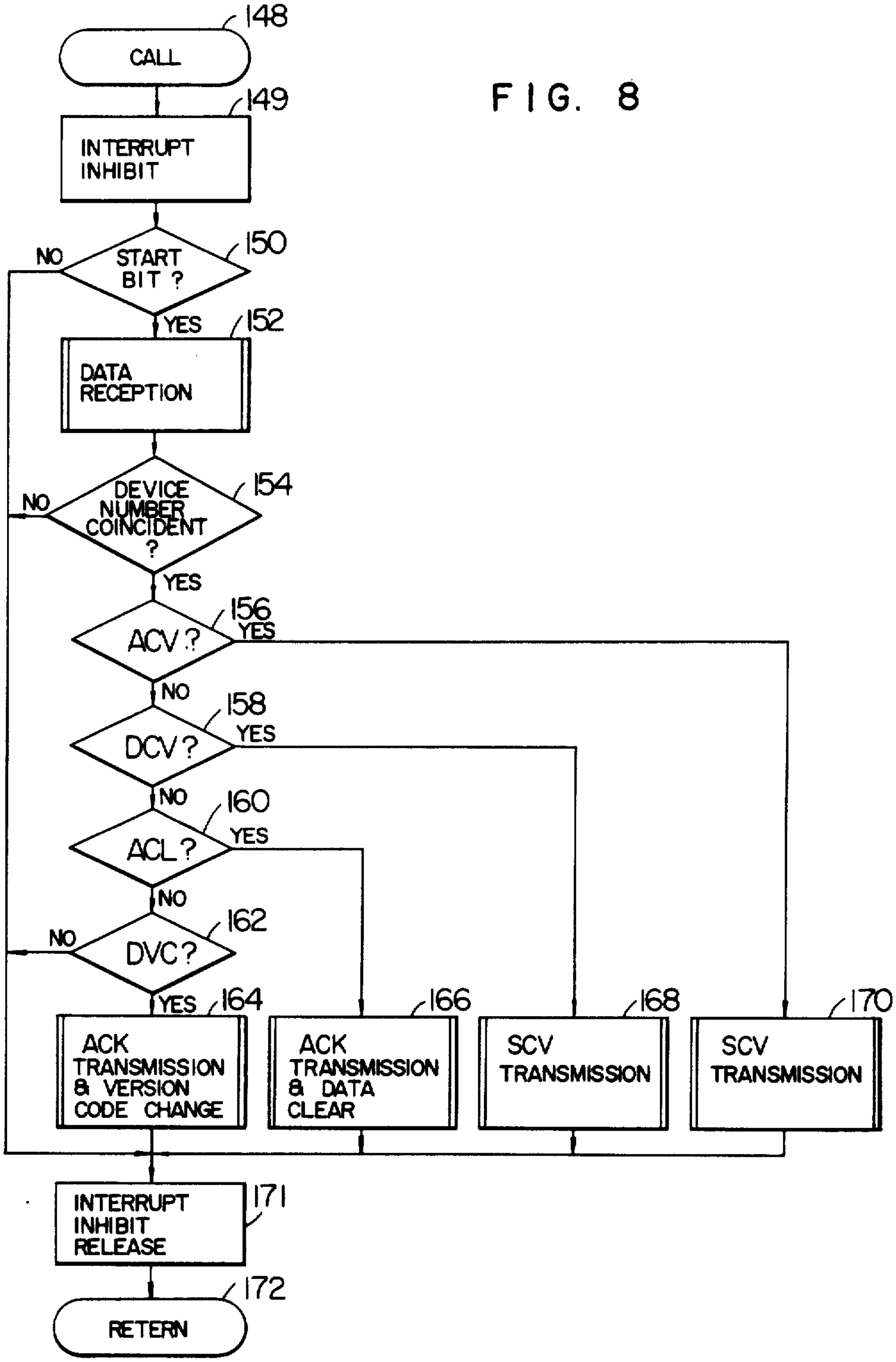
FIG. 8 is a flow chart showing the communication program of the terminal devices.

FIGS. 7 and 8 show a control program of the terminal devices. More specifically, FIG. 7 shows a main program cyclically performed repeatedly from its power-on start, and FIG. 8 shows a communication program which is executed periodically in response to a timer interruption that occurs at predetermined intervals. It is to be noted here that the period of the timer interruption for executing the communication program is selected to be a time interval sufficient to catch the start bit of the communication data sent from the central unit. In place of the use of this interruption processing at the predetermined intervals, it is possible to provide a jump instruction at various points of the main program such that a jump to the communication program is performed practically at predetermined intervals.

Referring first to FIG. 7, a step 104 indicates that the provision of a power supply 10*b* to the terminal device in response to the closing of the main switch (not shown) of the copying machine as well as the supply of a stabilized dc voltage to the various circuits from the power supply circuit 76 have been started so that a reset signal has been generated from the power-on reset circuit 78 and received by the microcomputer 48 thus starting the operations determined by the control program. Although not shown, after the start step 104 has been performed, an initialization step is performed to set all the output signals of the microcomputer 48 to the correct initial values. This initialization step determines the logical levels of the control signals 65*a* and 65*b* so as to operate the communication circuit 64 in the receiving mode.

A step 106 inputs the terminal device number assigned to the terminal device as a binary signal generated from the digital switch 74 and stores the signal at the corresponding storage locations in the internal RAM of the microcomputer 48.

A step 108 detects the presence or absence of the magnetic card 53 by checking the logical level of a detection signal 60*a* from the waveform reshaping circuit 60. When it is confirmed that the detection signal 60*a* has a logical level, e.g., "1" level indicative of the presence of the magnetic card 53, the location of the program to be executed is changed to a step 110. The step 110 receives successively in synchronism with the clock signals 56*b* the serial binary data signal 56*a* which coincides with the magnetic information recorded on the magnetic card 53 and stores the same at the corresponding storage locations of the internal RAM of the microcomputer 48.

Steps 112, 114 and 116 check whether the data read from the magnetic card 53 are proper. These check items include the checking of the data read from the card as to the propriety of the ID data, the data format and the version code. The ID code is preliminarily determined in the copying machine group managing apparatus comprising the central unit 40 and the selected terminal devices 20, 22, 24, 26 and 28, that is, the control program of each terminal device includes a predetermined comparison ID code (e.g., "1010") and the presence of equality between it and the ID code included in the data read is checked. The data format is preliminarily determined as shown in FIG. 3 and the presence of equality is checked with respect to the start and stop codes. Note that if necessary, a known type of format check such a check of the data bits or a parity check may be performed. As regards the version code, the presence of equality between it and the comparison version code preliminarily stored in one location of the pertinent users division location group (51*a*-8, 51*b*-8 or the like) in the terminal data memory 50 is checked in accordance with the instruction (DVC) from the central unit 40.

When the check result of any one of the check steps 112, 114 and 116 is negative, a step 118 causes the microcomputer 48 to apply to the switch circuit 72 an output signal to turn on the light-emitting diode 70, so that the light-emitting diode 70 is turned on to indicate that the data input from the magnetic card 53 is not proper or no equality is found with the version code. In this case, while the user is required to first withdrawn the card and perform again the operation for reading the card so as to ensure the proper data inputting, if the version code does not coincide or the use of the card (or the use of the copying machine by the users division) is inhibited by the modification of the version code in accordance with the instruction (DVC) from the central unit 40, the light-emitting diode 70 will be turned on even if the read operation is performed repeatedly. A step 120 checks the presence of the magnetic card 53, and when the card is removed, a step 122 resets the turn-on command for the light-emitting diode 70.

When the check results of the check steps 112, 114 and 116 are all affirmative, a step 124 controls the switch circuit 64 so that the logical level of the command signal 64*a* applied via the switch circuit 64 to the copying machine 10 under management is changed to that level (e.g., the "1" level) which enables the operation of the copying machine. The copying machine 10 is enabled to perform its copying operation only when it receives the command signal of the thus determined logical level and the copying operation is performed in response to the operation of the copy switch provided on the copying machine proper.

A step 126 specifies, following the step 124, one of the storage location groups in the terminal data memory 50 in accordance with the number code indicative of the users division number included in the data read from the magnetic card, reads the users division data of this users division (the values of the ones through the millions; see 51$a$, 51$b$, — 51$n$ of FIG. 4) and stores these values at the corresponding storage location group in the internal RAM of the microcomputer 48.

A step 128 then reads the terminal device data (the values of the ones through the ten-millions; see 51$z$ of FIG. 4) from the location group 51$z$ of the terminal data memory 50 and transfers the same to the corresponding storage location group in the internal RAM of the microcomputer 48.

A step 130 causes the digital display 66 to initiate its numerical display of the users division data of the users division. This display operation is performed by periodically executing a subroutine type display program (not shown) through the use of the internal interruption processing by the timer. In other words, the step 130 is such that the users division data which has been transferred to the internal RAM is set into a predetermined internal register, and when the inhibition on the timer interruption is released, the display program is automatically executed at predetermined intervals (about 2 milliseconds in this embodiment). This display program is of the known type so that the command signal for one cycle of light emission display is applied to the digital display 66 to cause it to visually display the data set in the internal register and then the program previously interrupted by the interruption is resumed to begin again. By thus energizing the display 66 repeatedly at as high the intervals as about 2 milliseconds, it is possible to cause the displayed numerical value to appear as if it stands still to the sight of the ordinary person. The operations of a step 132, et seq., are executed simultaneously with the repeated performance of the display program by the timer interruptions.

The step 132 receives from the switch circuit 62 a rectangular switch signal 62$a$ whose logical level changes twice during every copying operation of the copying machine 10 and detects the arrival of this switch signal. Since the logical level of the switch signal 62$a$ goes from "0" to "1" for every copying operation and goes from "1" to "0" after the lapse of several tens milliseconds, in the present invention the first transition of the logical level or the positive-going transition from "0" to "1" is checked.

When the arrival of the copy switch signal is detected by the step 132, a step 134 increments by 1 the users division data stored in the internal RAM of the microcomputer 48 and stores it again in the initial corresponding storage location group of the internal RAM. A step 136 then similarly increments by 1 the terminal device data stored in the internal RAM and stores it again in the initial corresponding storage location group of the internal RAM.

A step 138 writes the thus incremented users division data and terminal device data in the corresponding storage location groups of the terminal data memory 50. In this way, the latest users division data and terminal device data are always stored in the terminal data memory 50.

A step 140 causes the digital display 66 to initiate its numerical display of the incremented users division data. In other words, the new users division data is set in the internal register thus changing the value of the data which is to be numerically displayed according to the display program by the timer interruption.

A step 142 checks again the presence of the magnetic card 53 after the completion of the operation of the step 140 and also when the arrival of any copy switch signal is not detected by the check step 132. As long as the card 53 is present, the steps 132 to 140 for cumulatively adding up the number of copies data are repeated. On the other hand, if the card 53 is removed, the operations of a step 144, et seq., are performed.

The step 144 controls the switch circuit 64 in such a manner that the logical level of the command signal 64$a$ applied to the copying machine 10 via the switch circuit 64 is changed to that level (e.g., the "0" level) which disables the operation of the copying machine. Thus, the copying operation of the copying machine 10 is inhibited.

A step 146 stops the numerical display of the users division data on the digital display 66. In other words, the timer interruption is inhibited and the execution of the display program is stopped.

Referring now to FIG. 8 showing the communication program, after reaching a step 148, the microcomputer 48 initiates the execution of the communication program in accordance with the timer interruption. During the time that the communication program is executed (the time ranges from several hundreds $\mu$ seconds at the minimum to several seconds at the maximum), the previously mentioned main program is interrupted and the execution of the main program is resumed after the execution of the communication program. As a result, while there is the possibility of failing to detect any copying operation indicative switch signals 62$a$ during the execution of the communication program, the resulting error in the number of copies data can be ignored from the practical point of view. Moreover, in order to temporarily stop the previously mentioned execution of the display program by interruption during the time that the communication program is executed, an interruption inhibit instruction 149 is performed just after the call step 148 and an interruption inhibit release instruction 171 is performed just before a return instruction 172. Thus, during this inhibit time interval the timer interruption at intervals of about 2 $\mu$ seconds is not accepted and the display on the digital display 66 is temporarily ceased.

A step 150 checks the start bit of the communication data received by the communication circuit 64 from the central unit 40 by means of the logical level of the signal applied to the microcomputer 48 via the receiving data line 65$d$. As mentioned previously, the communication data (see FIG. 6) includes the header data 102$a$ and this header data 102$a$ is designed to always include a start bit which remains at a predetermined logical level (e.g., a "0" level) for a predetermined time. The check step 150 checks the presence of this start bit. When the start bit is detected by the check step 150, a step 152 stores at the corresponding allocated locations in the internal RAM of the microcomputer 48 the reception data signal (the serial binary signal) applied to the data line 65$d$ following the start bit.

A step 154 checks whether the terminal device number data (or polling address) 102$b$ included in the stored reception data coincides with the previously mentioned terminal device number data inputted by the main program step 106. If the two data coincide, it signifies that the reception data is the one generated in relation with this subject terminal device.

If the equality between the two terminal device number data is detected by the check step 154, then steps 156, 158, 160 and 162 check which of the instruction contents ACV, DCV, ACL and DVC is meant by the instruction contents data 102$c$. These instruction contents are preliminarily coded as different binary codes for the respective instructions and they are preliminarily preset and stored in the form of the identical codes in the two control programs which govern the operations of each terminal device and the central unit, respectively. The steps 156, 158, 160 and 168 successively compare the received instruction contents data 102c with the preset and stored binary codes corresponding to the instruction contents ACV, DCV, ACL and DVC.

If the instruction contents DVC are determined by the step 162, a step 164 produces communication data including an instruction contents data representing the acknowledgement of end of processing ACK, applies the same to the communication circuit 64 and thus reply to the central unit 40. In addition, one of the storage locations in the terminal data memory 50 is specified, that is, in accordance with the division number $N_1$, $N_2$, $N_3$ which is designated by the physical data 102d and 102e included in the reception data the corresponding users division version code storage location (i.e., one of the locations 51a-8, 51b-8, — 51n-8 of FIG. 4) is specified and the new version code data D included in the physical data is written into the specified storage location.

If the instruction contents ACL are determined by the step 160, a step 166 produces communication data including instruction contents data representing the acknowledgement of end of processing ACK and applies the same to the communication circuit 64 thus replying to the central unit 40. In addition, the corresponding storage locations in the terminal data memory 50 are selected, that is, all the storage locations storing the users division data (all the locations in the location groups 51a, 51b, — 51n excluding the locations 51a-8, 51b-8, — 51n-8 for the version code) and the storage location group 51z storing the terminal device data are successively selected and a data indicative of the number 0 is newly written into each of the selected locations.

If the instruction contents DCV are determined by the step 158, a step 168 produces communication data including the number of copies data of the specified users division and applies the same to the communication circuit 64 thus replying to the central unit 40. When this occurs, the microcomputer 48 selects the corresponding storage locations of the terminal data memory 50 from one of the location groups 51a, 51b, — 51n in accordance with the users division number data $N_1$, $N_2$, $N_3$ indicated by the physical data (102d, 102e) included in the reception data from the central unit 40 and then the users division data (from the ones to the millions data) stored in the selected location group is stored temporarily in the internal RAM. When sending the communication data, a predetermined code signal indicative of the instruction contents SCV is applied to the instruction contents data 102c and the users division data stored temporarily in the internal RAM is applied to the physical data 102d and 102e.

If the instruction contents ACV are determined by the step 156, a step 170 produces communication data including the number of copies data of all the users divisions and the terminal device data and transmits the same to the central unit 40 via the communication circuit 64. The microcomputer 48 successively selects the location groups 51a, 51b, — 51n of the terminal data memory 50 starting at the lowest users division number to successively assign the respective users division data, one set at a time, to the columns of the physical data 102d and 102e in the communication data while temporarily storing them in the internal RAM as in the case of the step 168 and finally produce the terminal device data in the like manner thus applying the desired transmission data to the communication circuit 64.

With the steps 164, — , 170, in order to operate the communication circuit 64 in the transmission mode only during the time that the transmission of the communication data from the terminal device to the central unit is effected, the microcomputer 48 applies "1" and "0" logical level signals to the control lines 65a and 65b, respectively, and upon completion of the data transmission "0" and "1" logical level signals are applied to the control lines 65a and 65b thus returning the communication function to the receiving mode.

Figure 9:
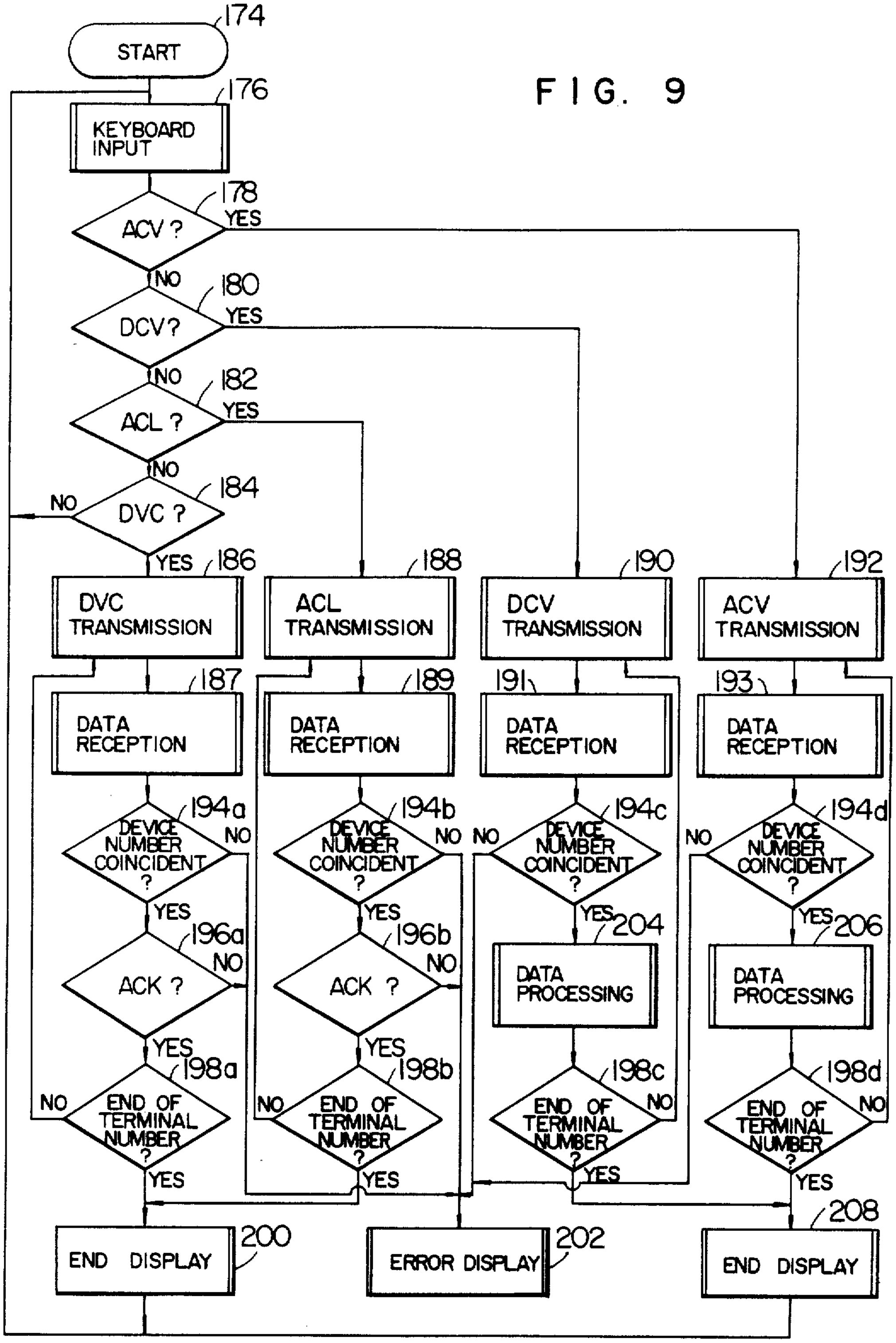
FIG. 9 is a flow chart showing the main program of the central unit.
Figure 11:
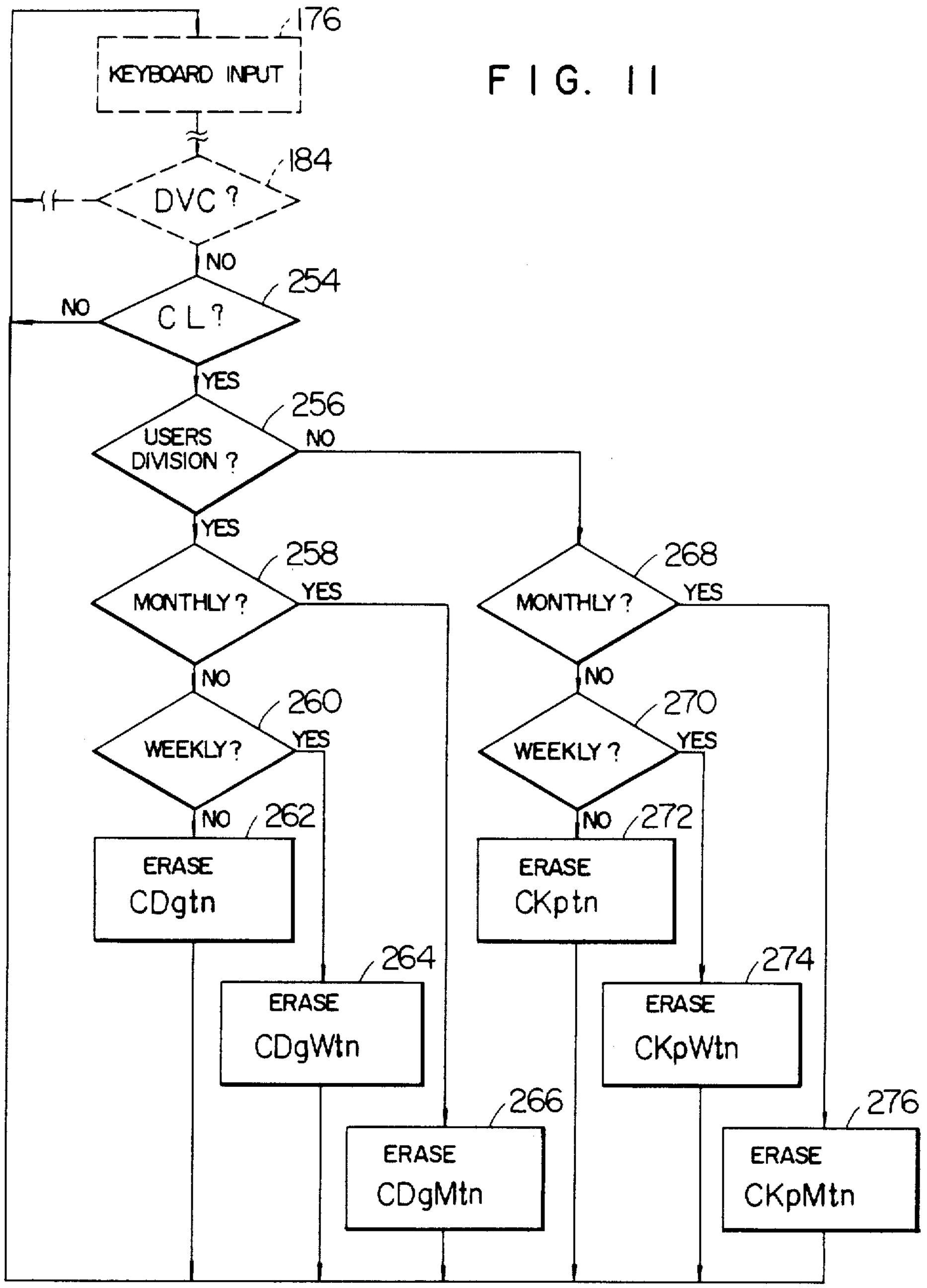
FIG. 11 is a flow chart showing the data clear program of the central unit.

FIGS. 9 and 11 shows the control programs of the central unit 40. FIG. 9 showing the control program concerning the summing process will now be described with reference to FIG. 5 and others. A step 174 indicates that upon connection of the power source in the central unit 40 the provision of the power supply 96a to each terminal devices is started so that the power supply circuit 76 starts supplying a stabilized dc voltage to the various circuits and the power-on reset circuit 98 generates a reset signal which in turn is received by the CPU 86 thus initiating the operations determined by the control program preset into the program memory 88.

A step 176 writes a set of significant code signals generated by the keyboard operation in the keyboard circuit 94 into the corresponding allocated locations of the central data memory 90 via the I/O port 92. Here, the code signals always include one of the previously mentioned four instructions ACV, DCV, ACL and DVC for which the central unit 40 can request the terminal devices 20, 22, 24, 26 and 28 to perform. Further, with respect to the instruction DCV, the keyboard operation in the keyboard circuit 64 additionally provides a code signal indicative of the users division number $N_1$, $N_2$, $N_3$ for specifying one of the subject users divisions for which the number of copies data are to be obtained and this code signal is written into another allocated storage locations of the central data memory 90 via the I/O port 92. Also, with respect to the instruction DVC, the keyboard operations in the keyboard circuit 94 additionally provides code signals indicative of the users division number $N_1$, $N_2$, $N_3$ and the version code D for specifying one of the subject users divisions for which the version code is to be changed and these code signals are also written into still another allocated storage locations of the central data memory 90 via the I/O port 92.

Here, the keyboard operations for generating the above-mentioned instruction representing code signals are determined preliminarily.

Steps 178, 180, 182 and 184 check the presence of equality between the keyboard operation indicative code signal data stored in the memory 90 and the comparison code signal data preset and stored preliminarily stored in the program memory 88 in correspondence to the instruction ACV, DCV, ACL and DVC.

When the step 184 determines that the keyboard operation represents the instruction DVC, a step 186 prepares a communication data for the transmission of this instruction, applies it to the communication circuit 82 and transmits it to the terminal devices 20, 22, 24, 26 and 28 via the signal lines 44 and 46. The communication data will now be described with reference to FIG. 6.

Now, applied to the terminal device number data frame **102*b* is a number data K which specifies one of the terminal devices. (With this data K, an initial value $K_0$ is preset and stored in the control program so that after the data $K_0$ has been transferred to a predetermined location of the central data memory 90, in response to the successive execution of the step 186 the data $K_0$ is incremented to data $K_1$, $K_2$, $K_3$— for specifying the succeeding terminal devices.) A binary code indicative of the instruction DVC is applied to the instruction contents data frame 102*c*, and the users division number $N_1$, $N_2$, $N_3$ and the new version code D indicated by the code signals inputted and stored by the keyboard operations are applied to the physical data frames 102*d* and 102*e***.

After the data transmission step 186 has been performed, a step 187 changes the operation of the communication circuit 82 to the receiving mode so that the reply data from the terminal device (that terminal device having the terminal device number specified by the number data K) is received. The received data is first stored in the corresponding location group of the central data memory 90.

A step **194*a* checks whether the terminal device number data 102*b*** included in the received data coincides with the number data K applied to the transmitted data.

A step **196*a* checks whether the instruction contents data 102*c*** coincides with the predetermined binary code indicative of the instruction ACK.

A step **198*a* checks whether the number data K stored in the memory 90 has reached a predetermined maximum value $K_{max}$ (the maximum users division number+1). In other words, it is determined whether the transmission of the communication data including the instruction DVC and the reception of the acknowledgement of end of processing ACK has been effected with respect to the terminal devices from the first terminal device of the number data $K_0$ to the last terminal device of the number data $K_{max}$. If the number data K has not reached the maximum value $K_{max}$, the processing is returned to the DVC transmission step 186** so that the instruction DVC is transmitted to the next terminal device specified by the incremented next number data.

When the step **198*a* determines that the change of version code has been effected with respect to all the terminal devices, a step 200 supplies a flashing signal of several seconds to the light-emitting diode 95*b* via the I/O port 92 and the driver circuit 95*a*. Then, the processing is returned to the step 176 thus making it ready to respond to the next keyboard operation. When any error in the received data is detected as a result of the check by the step 194*a* or 196*a*, a step 202 supplied a turn-on signal of several seconds to the light-emitting diode 95*b* via the I/O port 92 and the driver circuit 95*a***.

When the step 182 determines that the keyboard operation represents the instruction ACL, a step 188 produces a communication data for the transmission of this instruction, applies it to the communication circuit 82 and transmits it to the terminal devices 20, 22, 24, 26 and 28. Now describing the communication data with reference to FIG. 6, the number data K and the instruction ACL are applied in binary code form to the terminal device number data frame **102*b* and the instruction contents data frame 102*c*, respectively. The physical data frames 102*d* and 102*e* are blanked. Note that the frames 102*d* and 102*e*** are practically insignificant and thus they may be eliminated.

A step 189 receives the communication data transmitted from the terminal device and stores the same in the memory 90 in the like manner as the step 187.

Steps **194*b*, 196*b* and 198*b* and the steps 200 and 202** check the users division data and terminal device data of all the terminal devices for "0" clearance so as to give an acknowledgement indication or an error indication.

When the step 180 determines that the keyboard operation represents the instruction DCV, a step 190 produces the required communication data for transmitting this instruction and transmits the data to the terminal devices 20, 22, 24, 26 and 28 via the communication circuit 82. The communication data will now be described with reference to FIG. 6. The number data K for specifying each terminal device is applied to the terminal device data frame **102*b* and the instruction DCV is applied to the instruction contents frame 102*c*. The users division number $N_1$, $N_2$, $N_3$ which is indicated by the code signal inputted and stored by the keyboard operation is applied to the physical data frames 102*d* and 102*e***. These data are provided in binary code form.

A step 191 receives the communication data transmitted from the terminal devices and stores the same in the memory 90 in the like manner as the steps 187 and 189.

Steps **194*c* and 198*c* and the step 202** check whether the communication data from all the terminal devices have been received, and an error indication is given when there is any error in the terminal device number data.

A step 204 performs the required data processing on the users division data of the specified users division number $N_1$, $N_2$, $N_3$ which is included in the data received from all the terminal devices. The main point of this data processing resides in producing a sum of the users division data relating to a particular users division, that is, the operation of adding to the users division data of the particular users division in the first terminal device the similar data of the second terminal device, adding thereto the similar data of the third terminal device and so on is performed in response to the data received successively from the terminal devices and finally a total value of the number of copies made by the particular users division with respect to all the copying machines belonging to the copying machine group is obtained. The details of this summing operation will be described later.

When the step 178 determines that the keyboard operation represents the instruction ACV, a step 192 produces the necessary communication data for transmitting this instruction and transmits the same to the terminal devices 20, 22, 24, 26 and 28 via the communication circuit 82. Now describing the communication data with reference to FIG. 6, the terminal device specifying data K and the instruction ACV are applied in binary code form to the terminal device data frame **102*b* and the instruction contents data frame 102*c*. The physical data frames 102*d* and 102*e*** are blanked.

Steps **194*d* and 198*d* and the step 202** check whether the communication data from all the terminal devices have been received, and an error indication is given when there is any error in the terminal device number data.

A step 206 performs the required data processing on all the users division data and terminal device data included in the data received from all the terminal devices. The main points of this data processing reside in adding up the users division data of each users division each time the data is received from one of the terminal devices and thereby finally obtaining a total value of the copies made by each of the users divisions with respect to all the copying machines. In addition, this data processing adds up the terminal device data of each of the terminal devices separately.

A step 208 applies to the I/O port 92 a display data for a predetermined time so that a letter indicative of the end of this data processing such as "End" is displayed on the digital display 95*c*.

Next, the practical role played by the central unit in the copying machine group managing apparatus as well as the handling of the sum data will be described. While the description will be made in connection with the overall summation performed by the step 206, the summing operation performed by the step 206 for any particular users division will also be apparent from the following description.

From regularity point of view, the data summation in the central unit can be effected as a daily summation for every day, weekly summation for every week or monthly summation for every month. Of course, this summation period needs not always be fixed and it may be determined as desired.

Assume now that the cumulatively stored number of copies data of each terminal device is represented by $KpDqt_n$ (sheets), where Kp is the terminal device number, Dq the users division number and $t_n$ the period. When the use of each terminal device is started, all the users division data and the terminal device data are cleared to zero in response to the instruction ACL from the central unit and the cumulative sum values of the users division data and terminal device data for the period $t_n$ after the clear time $t_0$ are stored.

In order to store the summed data, the central unit provides two different storage location groups, that is, $CKpt_n$ for the number of copies data by terminal device and $CDqt_n$ for the number of copies data by users division, within the central data memory 90. In addition, the following four different storage location groups are provided for effecting the previously mentioned weekly and monthly summations.

| | |
|---|---|
| $CKpMt_n$: | monthly number of copies data by terminal device |
| $CKpWt_n$: | weekly number of copies data by terminal device |
| $CDqMt_n$: | monthly number of copies data by users division |
| $CDqWt_n$: | weekly number of copies data by users division. |

Figure 10:
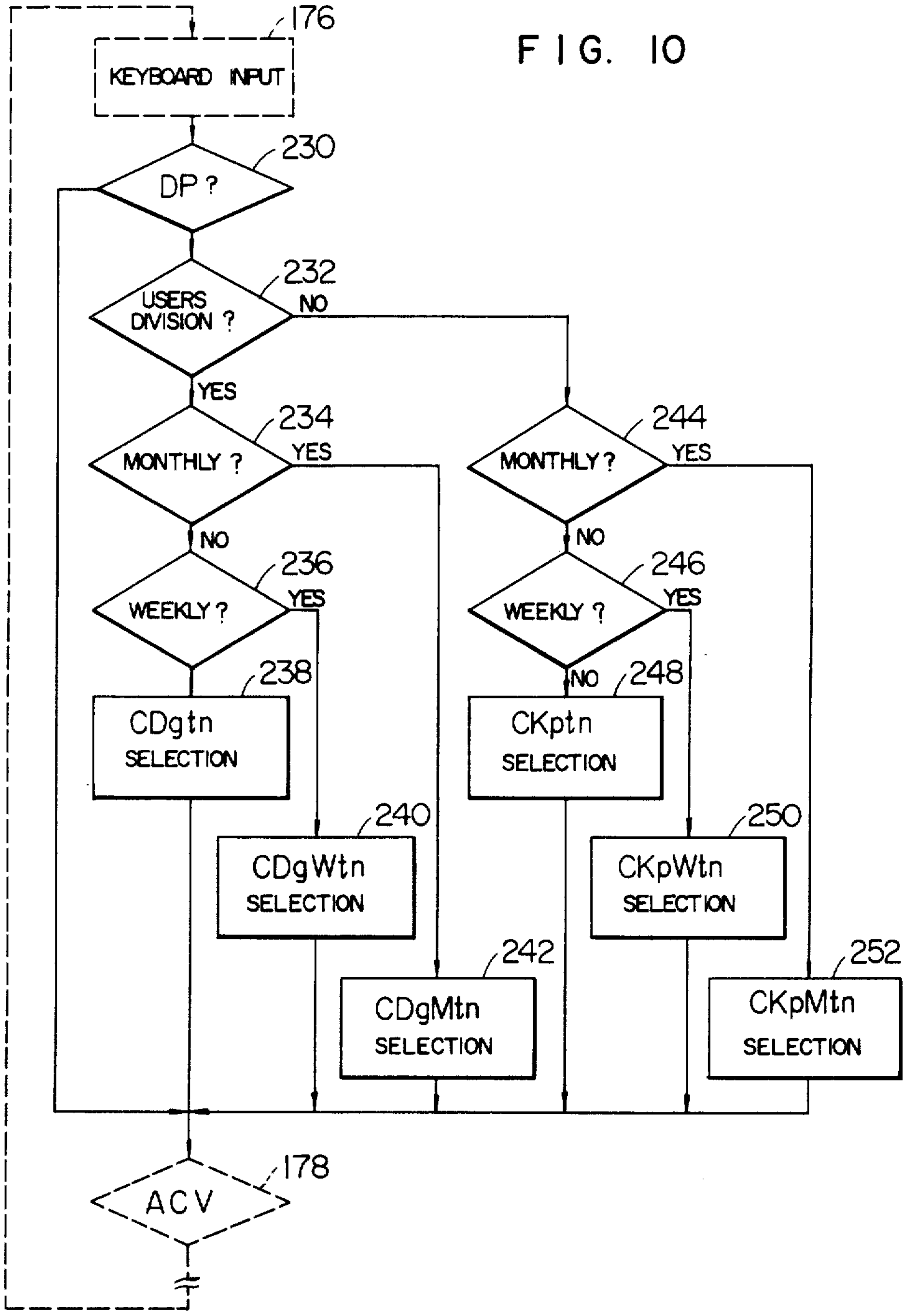
FIG. 10 is a flow chart showing the display program of the central unit.

Thus, by operating the keyboard in the central unit so as to input a distinction between the terminal device and users division data and a distinction between the monthly and weekly data through coded keyboard operations, any of the location groups $CKpt_n$, $CDqt_n$, $CKpMt_n$, $CKpWt_n$, $CDqMt_n$ and $CDqWt_n$ can be selected in accordance with the display program shown in FIG. 10 thus causing the digital display 95*c* to display the data stored in the selected location group. This display program will be described later.

After the terminal devices 20, 22, 24, 26 and 28 have been operated for a predetermined period, in the central unit 40 the keyboard of the keyboard circuit 94 is operated so as to execute the instruction ACV for summing purposes and thus the central unit 40 performs the computational processing including the steps 176, 178, 192, 193, 194*d*, 206, 198*d* and 208 in the control program of FIG. 9 (the step 192 and the following are repeated).

In the course of this processing, a data $K_1Dqt_n$ (where Dq is $D_1$ to $D_{max}$) is received from the first terminal device (the number is $K_1$).

The step 206 performs the following operations pertaining to the terminal device data summation.

$$CK_1t_n = K_1 \sum_{q=1}^{S} Dqt_n \text{ (where } S \text{ is the maximum users division number)}$$

$$CK_1Mt_n = CK_1t_{n-1} + (CK_1t_n - CK_1Mt_{n-1})$$

$$CK_1Wt_n = CK_1Wt_{n-1} + (CK_1t_n - CK_1Mt_{n-1}).$$

These operations are performed in response to the receipt of data $K_2Dqt_n$, $K_3Dqt_n$, — from the second, third, — terminal devices, respectively.

In addition, the step 206 performs the following operations pertaining to the users division data summation.

$$CD_1t_n = D_1 \sum_{p=1}^{T} Ppt_n \text{ (where } T \text{ is the maximum terminal device number)}$$

$$CD_1Mt_n = CD_1Mt_{n-1} + (CD_1t_n - CD_1Mt_{n-1})$$

$$CD_1Wt_n = CD_1Wt_{n-1} + (CD_1t_n - CD_1Mt_{n-1}).$$

These operations are performed successively with respect to the users divisions $D_1$ to $D_{max}$ in response to the receipt of the data $K_2D\ t_n$, $K_3Dqt_n$, —, producing data $CD_2t_n$, $CD_3t_n$, —, $CD_2Mt_n$, $CD_3t_n$, —, $CD_2Wt_n$, $CD_3Wt_n$. The computed data are stored in the above-mentioned storage location groups in the central data memory 90.

In the copying machine group managing apparatus provided in accordance with the present invention, the data which is considered most important is raw data or the data $KpDqt_n$ stored in the terminal data memory of each of the terminal devices. This data is accumulated and retained until an erase instruction is issued from the central unit 40. In managing the utilization values of a plurality of (a large number of) users divisions and copying machines in this way, it is essential to ensure an efficient arrangement of data memories as a resource and also establish reliability of the apparatus as a whole against unexpected situations.

Next, the process of data summation will be described in detail over a specific fixed management period.

Firstly, when obtaining weekly sum data every day over periods $t_1$, $t_2$, $t_3$, $t_4$ and $t_5$ (the first to fifth day), the first terminal device data changes as follows:

$$CK_1Wt_1 = CK_1Wt_0 + (CK_1t_1 - CK_1Mt_0) \quad \text{1st day}$$
$$CK_1Wt_2 = CK_1Wt_1 + (CK_1t_2 - CK_1Mt_1) \quad \text{2nd day}$$
$$CK_1Wt_3 = CK_1Wt_2 + (CK_1t_3 - CK_1Mt_2) \quad \text{3rd day}$$
$$CK_1Wt_4 = CK_1Wt_3 + (CK_1t_4 - CK_1Mt_3) \quad \text{4th day}$$
$$CK_1Wt_5 = CK_1Wt_4 + (CK_1t_5 - CK_1Mt_4) \quad \text{5th day.}$$

The similar changes take place with respect to $CK_2t_5$, $CK_3t_5$, — .

On the other hand, the first users division data changes as follows:

$$CD_1Wt_1 = CD_1Wt_0 + (CD_1t_1 - CD_1Mt_0) \quad \text{1st day}$$
$$CD_1Wt_2 = CD_1Wt_1 + (CD_1t_2 - CD_1Mt_1) \quad \text{2nd day}$$
$$CD_1Wt_3 = CD_1Wt_2 + (CD_1t_3 - CD_1Mt_2) \quad \text{3rd day}$$
$$CD_1Wt_4 = CD_1Wt_3 + (CD_1t_4 - CD_1Mt_3) \quad \text{4th day}$$
$$CD_1Wt_5 = CD_1Wt_4 + (CD_1t_5 - CD_1Mt_4) \quad \text{5th day.}$$

The similar changes take place with respect to $CD_2t_5$, $CD_3t_5$, —.

Then, the weekly sum data over the five days are displayed on the digital display in response to a display command, and when the data becomes useless, the corresponding storage location groups of the central data memory are cleared to zero through the operation of the keyboard (the clear program for this prupose will be described later), thus making it possible to obtain new weekly sum data for the sixth day on.

By thus providing the storage location groups for the weekly data $CKpWt_n$ and $CDqWt_n$, it is also possible to obtain the desired sum total data as well as weekly data between the monthly sum data.

Now considering a case where monthly sum data over a period $t_{21}$ (up to the 21st day) are desired, firstly the first terminal device data can be obtained from the following calculation $$CK_1Mt_{21} = \sum_{n=1}^{21} (CK_1t_n - CK_1Mt_{n-1}).$$

The other numerical value group of the second, third, — terminal device data $CK_2Mt_{21}$, $CK_3Mt_{21}$— can be calculated in the like manner.

On the other hand, the first users division data can be obtained from the following calculation $$CD_1Mt_{21} = \sum_{n-1}^{21} (CD_1t_n - CD_1Mt_{n-1}).$$

The other numerical value group of the second, third, — users division data $CD_2Mt_{21}$, $CD_3Mt_{21}$— can be obtained in the like manner.

When the monthly sum data are not longer needed, all the storage location groups in the central data memory are cleared to zero, thus standing ready to obtain the next monthly data. Also, the instruction ACL is sent to the terminal devices so that the raw data $KpDqt_{21}$ in each of the terminal devices is also cleared to zero.

As shown in FIG. 10, the display processing program including steps 230, — , 252, is added to follow the step 176 which inputs as a data the code signal generated from the keyboard circuit 94 through a keyboard operation. For the purpose of data display selection, the keyboard circuit 94 is designed so that it is possible to input by keyboarding a display instruction DP, users division data and terminal device data selection codes, monthly and weekly data selection codes, users division numbers Dq for the users division data and terminal device numbers Kp for the terminal device data.

Thus, the step 230 checks whether the code signal inputted by keyboarding is the display instruction DP, and the step 232 checks whether the display of the users division data is selected. The steps 234 and 244 check whether the display of the monthly data is requested, and the steps 236 and 246 check whether the display of the weekly data is requested.

The steps 238, 240 and 242 respectively read from the corresponding storage locations of the central data memory 90 the total number of copies data CDq+n, weekly number of copies data $CDqWt_n$ and monthly number of copies data $CDqMt_n$ with respect to the requested users division number Dq and apply the same to the digital display 95c via the I/O port 92.

The steps 248, 250 and 252 respectively read from the corresponding storage locations of the central data memory 90 the total number of copies data $CKpt_n$, weekly number of copies data $CKpWt_n$ and monthly number of copies data $CKpMt_n$ and apply the same to the digital display 95c via the I/O port 92.

FIG. 11 shows a clear program for the central data memory 90. This clear program including steps 254, — , 276, is added to follow the step 176 which inputs as a data the code signal generated by keyboarding in the keyboard circuit 94. In order to selectively clear the data to zero, the keyboard circuit 94 is designed so that it is possible to input by keyboarding a clear instruction CL, users division data and terminal device data selection codes, monthly and weekly data selection codes, users division numbers Dq and terminal device numbers Kp.

Thus, the steps 254, 256, 258, 260, 268 and 270 successively check whether the clear instruction CL is inputted, and if it is, whether the data to be cleared is the users division data or the terminal device data and whether the monthly data, the weekly data or the total number of copies data.

While the specific embodiment has been described in detail, the invention is not intended to be limited thereto and various known technical means may be used within the scope of the invention as specifically set forth in the following claim.

What is claimed is:

1. An apparatus for managing a plurality of copying machines comprising:

a plurality of terminal devices each operatively associated with one of a plurality of copying machines, each said terminal device including (a) first input means for receiving code signals each indicative of one of a plurality of users, (b) second input means for receiving a signal indicative of the copying operation of its associated copying machine, (c) data processing means for enabling the copying operation of said associated copying machine upon receipt of said code signals and including terminal data memory means having a plurality of distinguishable storage locations for each of said users, whereby said signal indicative of the copying operation received by said second input means is cumulatively stored in corresponding storage locations of said terminal data memory means specified by said code signals received by said first input means, and (d) first communication means provided in the terminal device for data transmission from and to said data processing means; and a central unit directly connected to each of said plurality of terminal devices through transmission lines, said central unit including (e) second communication means provided in the central unit for data transmission from and to each said first communication means of said terminal devices, (f) central data processing means for controlling data transmission to and from said terminal devices and including central data memory means having a plurality of distinguishable storage locations for each of said plurality of users, whereby data cumulatively stored in each of said terminal data memory means and transmitted through said first and second communication means are summed up separately for each of said users and stored in corresponding storage locations of said central data memory means specified by said code signals, and (g) manually operable means for generating first and second commands, said central data processing means being operative to effectuate the data summing-up and storing operation of said central data memory means upon receipt of said first command from said manually operable means and operative to erase said data cumulatively stored in each of the corresponding storage locations of all said terminal data memory means upon receipt of said second command from said manually operable means.

* * * * *